US006711899B2

(12) United States Patent
Bast et al.

(10) Patent No.: US 6,711,899 B2
(45) Date of Patent: Mar. 30, 2004

(54) HEAT SHIELD BLOCK AND USE OF A HEAT SHIELD BLOCK IN A COMBUSTION CHAMBER

(75) Inventors: Ulrich Bast, Munich (DE); Uwe Rettig, Munich (DE); Christine Taut, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/228,743

(22) Filed: Aug. 27, 2002

(65) Prior Publication Data

US 2003/0056515 A1 Mar. 27, 2003

(30) Foreign Application Priority Data

Aug. 28, 2001 (EP) ........................................... 01120506

(51) Int. Cl.[7] ............................. F27D 1/04; F27D 1/08; F02C 1/00

(52) U.S. Cl. ........................... 60/752; 60/753; 110/336; 110/338

(58) Field of Search .......................... 60/752, 753, 755; 110/338, 336, 339, 340; 432/249, 251

(56) References Cited

U.S. PATENT DOCUMENTS 2,548,485 A * 4/1951 Lubbock ...................... 60/753
2,656,717 A * 10/1953 Fourmanoit ................. 110/336
2,915,877 A * 12/1959 Darling ....................... 60/753
3,496,722 A * 2/1970 Howes ........................ 60/757
3,956,886 A * 5/1976 Sedgwick .................... 60/753
4,435,813 A * 3/1984 Stenkvist .................... 110/338
4,675,223 A * 6/1987 Trummer .................... 110/336
5,050,385 A * 9/1991 Hirose et al. ................. 60/752
5,083,424 A * 1/1992 Becker ........................ 60/754
5,107,641 A * 4/1992 Davis ......................... 110/338
5,431,020 A * 7/1995 Maghon ...................... 60/753
5,624,256 A * 4/1997 Pfeiffer et al. .............. 110/336
6,085,515 A * 7/2000 Walz et al. .................. 60/800

FOREIGN PATENT DOCUMENTS

DE 3625056 A1 * 1/1988

* cited by examiner

*Primary Examiner*—Ted Kim

(57) ABSTRACT

The invention relates to a heat shield block, in particular for lining a combustion chamber wall, having a hot side which can be subjected to a hot medium, a wall side opposite the hot side, and a peripheral side adjoining the hot side and the wall side. A tension element which can be prestressed to a prestress ($F_z$) is attached to the peripheral side, release of a fragment, formed during a fracture, of the heat shield block being reliably prevented by the prestress ($F_z$) of the tension element. The invention also relates to the use of a heat shield block, in particular for lining a combustion chamber wall of a gas turbine.

15 Claims, 4 Drawing Sheets

HEAT SHIELD BLOCK AND USE OF A HEAT SHIELD BLOCK IN A COMBUSTION CHAMBER

CROSS-REFERENCE TO RELATED APPLICATIONS

This application claims priority to EP/01120506.9 filed Aug. 28th, 2001 under the European Patent Convention and which is incorporated by reference herein in its entirety.

FIELD OF THE INVENTION

The invention relates to a heat shield block, in particular for lining a combustion chamber wall, having a hot side which can be subjected to a hot medium, a wall side opposite the hot side, and a peripheral side adjoining the hot side and the wall side. The invention also relates to the use of a heat shield block, in particular for lining a combustion chamber wall.

BACKGROUND OF THE INVENTION

A thermally and/or thermomechanically highly loaded combustion space, such as, for example, a furnace, a hot gas duct, or a combustion chamber of a gas turbine, in which a hot medium is produced and/or directed is provided with an appropriate lining for protection from excessive thermal stressing. The lining normally consists of heat-resistant material and protects a wall of the combustion space from direct contact with the hot medium and the associated high thermal loading.

U.S. Pat. No. 4,840,131 relates to a fastening of ceramic lining elements on a wall of a furnace. In this case, a rail system which is fastened to the wall and has a plurality of ceramic rail elements is provided. The lining elements can be mounted on the wall by the rail system. Further ceramic layers may be provided between a lining element and the wall of the furnace, inter alia a layer of loose, partly compressed ceramic fibers, this layer having at least approximately the same thickness as the ceramic lining elements or a greater thickness. The lining elements in this case have a rectangular shape with a planar surface and are made of a heat-insulating, refractory ceramic fiber material.

U.S. Pat. No. 4,835,831 likewise deals with the application of a refractory lining to a wall of a furnace, in particular to a vertically arranged wall. A layer consisting of glass fibers, ceramic fibers or mineral fibers is applied to the metallic wall of the furnace. This layer is fastened to the wall by means of metallic clips or by adhesive. A wire mesh net with honeycomb meshes is applied to this layer. The mesh net likewise serves to prevent the layer of ceramic fibers from falling down. By means of a suitable spray process, a uniform closed surface of refractory material is applied to the layer thus fastened. The method described largely prevents a situation in which refractory particles striking during the spraying are thrown back, as would be the case with direct spraying of the refractory particles onto the metallic wall.

A ceramic lining of the walls of thermally highly stressed combustion spaces, for example of gas-turbine combustion chambers, is described in EP 0 724 116 A2. The lining consists of wall elements of high-temperature-resistant structural ceramic, such as, for example, silicon carbide (SiC) or silicon nitride ($Si_3N_4$). The wall elements are elastically fastened to a metallic supporting structure (wall) of the combustion chamber in a mechanical manner by means of a central fastening bolt. A thick thermal insulating layer is provided between the wall element and the wall of the combustion space, so that the wall element is at a corresponding distance from the wall of the combustion chamber. The insulating layer, which is about three times as thick in relation to the wall element, is made of a ceramic fiber material which is prefabricated in blocks. The dimensions and the external shape of the wall elements can be adapted to the geometry of the space to be lined.

Another type of lining of a thermally highly loaded combustion space is specified in EP 0 419 487 B1. The lining consists of heat shield elements which are mechanically mounted on a metallic wall of the combustion space. The heat shield elements touch the metallic wall directly. In order to avoid excessive heating of the wall, e.g. as a result of direct heat transfer from the heat shield element or by introducing hot medium into the gaps formed by the heat shield elements adjoining one another, cooling air, the "sealing air", is admitted to the space formed by the wall of the combustion space and the heat shield element. The sealing air prevents the penetration of hot medium up to the wall and at the same time cools the wall and the heat shield element.

WO 99/47874 relates to a wall segment for a combustion space and to a combustion space of a gas turbine. Specified in this case is a wall segment for a combustion space which can be acted upon by a hot fluid, e.g. a hot gas, having a metallic supporting structure and a heat protection element fastened to the metallic supporting structure. Inserted between the metallic supporting structure and the heat protection element is a deformable separating layer which is intended to absorb and largely compensate for possible relative movements of the heat protection element and the supporting structure. Such relative movements may be caused, for example, in the combustion chamber of a gas turbine, in particular in an annular combustion chamber, by different thermal expansion behavior of the materials used or by pulsations in the combustion space, as may arise during irregular combustion for producing the hot working medium or by resonance effects. At the same time, the separating layer causes the relatively inelastic heat protection element to rest in a more planar manner overall on the separating layer and the metallic supporting structure, since the heat protection element partly penetrates into the separating layer. The separating layer, for production reasons, can thus compensate for unevenness at the supporting structure and/or the heat protection element, which unevenness may lead locally to an unfavorable force input.

SUMMARY OF THE INVENTION

The invention is based on the observation that, in particular ceramic, heat shield blocks, on account of their requisite flexibility with regard to thermal expansions, are often only inadequately protected against mechanical loads, such as shocks or vibrations for example.

The object of the invention is accordingly to specify a heat shield block which ensures high operating reliability with regard to both unrestricted thermal expansion and stability relative to mechanical, in particular shock-like, loads. A further object of the invention consists in specifying the use of the heat shield block, in particular for lining a combustion chamber wall.

The object which relates to a heat shield block is achieved according to the invention by a heat shield block, in particular for lining a combustion chamber wall, having a hot side which can be subjected to a hot medium, a wall side opposite the hot side, and a peripheral side adjoining the hot side and the wall side, a tension element which can be prestressed to a prestress being attached to the peripheral side, release of a fragment formed during a fracture being prevented by the prestress of the tension element.

The invention shows a completely new way of providing lasting protection for heat shield blocks against high accelerations as a result of shocks or vibrations. In this case, the invention is already based on the knowledge that steady and/or transient vibrations in a combustion chamber wall induce corresponding vibrations in heat shield blocks as normally used for lining said combustion chamber wall. In this case, considerable accelerations above a limit acceleration may occur, in particular in a resonance case, in the course of which the heat shield blocks lift from the combustion chamber wall and consequently strike again. Such striking on the solid or also partly damped combustion chamber wall leads to very high forces on the heat shield blocks and may cause considerable damage, e.g. fracture of the latter. There is also the exceptionally high thermal loading of the heat shield block on account of the admission of a hot medium to the heat shield block during operation. Incipient cracks may therefore occur on both the wall side and the hot side of the heat shield block, there also being the risk of material being released from the heat shield block as crack growth increases during continued operation. This leads to a considerable reduction in the endurance of a heat shield block, in particular because such incipient cracks may lead to a crack through the material and thus to a fracture and complete failure of the entire heat shield block. Consequently, there is the acute risk that fragments may pass into the combustion space and cause massive damage to further components of the combustion chamber or, for example during use in the gas turbine, to the sensitive blading region having turbine blades.

With the proposed heat shield block having a tension element which can be prestressed at the peripheral side to a prestress, extremely efficient protection, with long-term stability, for heat shield blocks is specified for the first time. In this case, the tension element can advantageously be prestressed to a prestress in the peripheral direction, a corresponding compressive stress being produced in the interior of the heat shield block, this compressive stress clipping the block together. The heat shield block is therefore held under compressive prestress by the tension element, so that tensile bending forces acting on the heat shield block are reduced and the crack growth is thus slowed down. By this compressive stress, which is directed at least partly in the direction of the interior of the heat shield block, the heat shield block is secured even at a comparatively low prestress of the tension element. In this way, a possible incipient crack in the material, for example as a result of shock loading or thermal loading, is effectively countered. Existing incipient cracks in the material, given an appropriate geometric configuration and arrangement of the tension element, cannot develop or expand along the hot side of the heat shield block, or can only do so to a limited extent. The tension element holds the heat shield block together, as it were, and protects it against incipient cracks in the material, on the one hand, and in particular against a crack right through the material, on the other hand. In addition to this primary protective function, the risk of smaller or larger fragments being released or falling out in the event of a possible crack through the material or of a fracture is also effectively countered. The compressive stress produced by the prestress of the tension element prevents release of a fragment formed during a fracture.

Especially advantageous is the increase in the passive safety of the heat shield block compared with the conventional configurations. An incipient crack in the material or a crack through the material is countered by the prestressed tension element, release of a fragment of the heat shield block being prevented in the event of a crack through the material.

Furthermore, the configuration of the heat shield block with the tension element results in the advantage of problem-free prefabrication and ease of assembly of the heat shield block, for example for fitting in a combustion chamber. The tension element is simply attached at the peripheral side and prestressed in the peripheral direction according to requirements, the tension element being given a predetermined tensile stress. However, the tension element can be fitted in such a way that it is still not prestressed (prestress equals zero); the prestress is produced during operation at high temperature, to be precise by the different coefficients of thermal expansion of tension element and block. This high flexibility on the one hand and the attainable endurance of the heat shield block on the other hand are also especially advantageous from the economic point of view. In particular, inspection or maintenance intervals for the heat shield block, for example when used in a combustion chamber of a gas turbine, are extended. If the heat shield block fractures, operation need not be stopped immediately for inspecting the plant, since, on account of the increased passive safety, continued operation up to the regular inspection interval or even beyond this is possible. The heat shield block is therefore characterized by special emergency-running properties.

In an especially preferred configuration, the tension element is stress-free at a normal temperature, and the tension element is under the prestress at an application temperature above the normal temperature. The tension element in this case can advantageously be dimensioned in such a way that deliberate mismatching of the coefficients of thermal expansion between heat shield block and tension element is used to apply a sufficiently large compressive stress, imparted by the prestress of the tension element, to the heat shield block during operation, i.e. at an application temperature of up to 1200° C. of the hot medium striking the hot side of the heat shield block. However, this prestress is at the same time advantageously set so low that it does not lead to creep deformation and relaxation of the tension element or that it even does not reach the magnitude of the maximum permissible prestress of the tension element. In this case, the normal temperature at which the tension element is stress-free is advantageously room temperature, that is to say about 20° C., which permits especially simple attachment of the tension element to the peripheral side of the heat shield block during assembly.

The prestress is advantageously directed in the peripheral direction, i.e. the prestress has at least one component in the peripheral direction of the heat shield block. The peripheral direction in this case is essentially perpendicular to the surface normal of the hot side or the wall side. As a result, any fragments of the heat shield block are compressed in the peripheral direction by a corresponding compressive stress. Release of the fragments in the direction of the surface normal of the hot side is prevented as a result of a wedging effect of the fragments.

In a preferred configuration, the peripheral side has a peripheral groove, in which the tension element engages. The peripheral groove is configured in such a way that it largely integrates the tension element in the heat shield block.

In general, heat shield blocks are secured in the peripheral direction by two "block holder pairs", so that, in the event of a fracture in the peripheral direction, each fragment is only held by one respective block holder pair. In this case, the block holder pairs are arranged on the peripheral side of the heat shield block on sides opposite one another and establish a first axis of the heat shield block. Along a second axis, which is directed perpendicularly to the first axis and generally corresponds with the flow direction of the hot medium along the hot side of the heat shield block, the heat shield block, on the peripheral side, has the peripheral groove accommodating the tension element. The sides of the peripheral side which are opposite one another along the second axis are also designated as end faces of the heat shield block. Each end face may have a respective peripheral groove, in which a respective tension element engages, this tension element being under prestress during operation. For especially advantageous and reliable engagement of the tension element in the peripheral groove, the latter may be additionally provided with holes, for example blind holes, at each end of the peripheral groove. As a result, the tension element can be inserted or put into the heat shield block in a concealed and thus, as it were, fully integrated manner and is thereby advantageously not directly exposed to any inflowing hot gas. To avoid excessive mechanical or thermomechanical stresses, the peripheral groove and possibly the additional holes are designed with radii.

The peripheral side advantageously has a peripheral-side surface, the tension element engaging in the peripheral groove in such a way that the tension element is set back from the peripheral-side surface or terminates flush with the latter. In this case, the tension element may be designed in different ways and may at the same time have such a configuration that a favorable combination of low-stress design and cost-effective manufacture is achieved. The cross section of the tension element may be configured to be both rectangular and round or oval. Here, in an advantageous manner, no sharp corners or edges are produced either on the tension element or on the peripheral groove or possibly the additional holes in the heat shield block.

In an especially simple and preferred geometric configuration, the tension element comprises a web, on the axial ends of which in each case a finger-shaped anchor extending essentially perpendicularly to the web is provided. In this case, the web and anchor have essentially the same form and the same cross section. After the tension element has been attached to the peripheral side of the heat shield block, the finger-shaped anchors project into respective holes in the heat shield block, the web engaging in the peripheral groove. The web here advantageously terminates flush with the peripheral-side surface, in which case a certain clearance is to be provided between the tension element and the peripheral groove, so that thermal arching of the heat shield block, which generally occurs during operation, in the direction of the surface normal of the hot side is tolerated.

The tension element is preferably made of a ceramic material, in particular an $Si_3N_4$-based ceramic. This high-temperature, creep- and corrosion-resistant base ceramic specially developed for high-temperature applications under gas turbine atmosphere appears to be especially suitable for use as tension element on account of the high operating temperatures of about 1000° C., but also occasionally up to 1200° C., to be expected. In this case, the tension element may be produced from a solid ceramic, which may be additionally encased with elastic fiber-ceramic material at the finger-shaped anchors, with which the tension element engages in the interior of the heat shield block. As a result, especially firm and durable anchoring of the tension element in the heat shield block can be achieved.

The tension element is preferably fastened by means of an adhesive. Here, the tension element is at least partly adhesively bonded to the heat shield block, in which case the adhesive connection is to be provided between the tension element and the heat shield block, preferably in the region of the finger-shaped anchors. The adhesive bonding additionally protects the tension element from possible release and correspondingly increases the endurance. When the tension element is adhesively bonded to the heat shield block, both a conventional adhesive and a high-temperature-resistant adhesive may be used. Silica-based adhesives, which have excellent adhesive properties and a high temperature resistance, may also be used. The use of a ceramic material for the tension element proves to be especially advantageous in the case of the adhesive connection.

In an especially preferred configuration, the tension element has a passage into which the adhesive for anchoring the tension element can be introduced.

To this end, the tension element may be produced, for example, from a "ceramic tubular material", as a result of which a passage or a corresponding multiplicity of passages can be realized for the tension element.

In a configuration of the tension element with a web, from which a finger-shaped anchor branches off at a respective axial end perpendicularly to the web, the finger-shaped anchors are provided with openings preferably over the entire axial extent of the finger-shaped anchor and the entire periphery of the anchor. In addition, a filling opening is provided, via which the adhesive can be introduced into the passage. After the tension element has been inserted into the heat shield block, the adhesive is injected through the filling opening into the passage or the multiplicity of passages and comes out of the openings of the finger-shaped anchors. After the adhesive has set, a firm bond over a large area between the heat shield block and the tension element in the region of the finger-shaped anchors can thereby be achieved.

A further tension element is preferably provided, this further tension element being attached to the peripheral side and being opposite the tension element.

In this case, the tension element and the further tension element are advantageously attached to a respective end face of the heat shield block, as a result of which crack growth or a fracture of the heat shield block in the flow direction of the hot gas is avoided.

The heat shield block is preferably made of a ceramic parent material, in particular a refractory ceramic. By the selection of a ceramic as parent material for the heat shield block, the use of the heat shield block up to very high temperatures is reliably ensured, in which case at the same time oxidative and/or corrosive attacks, as occur when a hot medium, e.g. a hot gas, is admitted to the hot side of the heat shield block, are to a very large extent harmless for the heat shield block. As a result, the tension element can advantageously be effectively connected to the ceramic parent material of the heat shield block. In this case, the firm connection, as already discussed above, may be configured as a releasable connection. A suitable connection, in addition to adhesive bonding, is the attachment of the tension element by means of suitable fastening elements at the peripheral side, e.g. by suitable clipping or by a screwed connection. However, by the selection of a tension element which is made at least partly of a ceramic material, good adaptation to the ceramic parent material of the heat shield block with regard to thermomechanical properties is also achieved. By the firm anchoring of the tension element to the parent material, the heat shield block, at least at the high application temperature, is advantageously configured so as to form a type of fixed composite with the tension element. The heat shield block thus has a compact type of construction and structure which has exceptionally high endurance and passive safety even during high thermal and/or mechanical loading. This is especially advantageous when the heat shield block is used in a combustion chamber, because, even after an incipient crack or crack through the material, the heat shield function of the heat shield block continues to be ensured; in particular, no fragments can pass into the combustion space.

In economic terms, this results, on the one hand, in the advantage that no exceptional maintenance and/or inspection of a combustion chamber having the heat shield block is necessary in the normal operating case. On the other hand, the heat shield block, in the case of special events, has emergency-running properties, so that consequential damage to a turbine, for example the blading of the turbine, can be avoided. The combustion chamber may be operated at least with the conventional maintenance cycles, although a decrease in the stoppage times can also be achieved on account of the passive safety increased with the tension element.

The object which relates to the use of a heat shield block is achieved according to the invention by the use of a heat shield block according to the above explanations in a combustion chamber, in particular a combustion chamber of a gas turbine.

The advantages of the use of the heat shield block in a combustion chamber, in particular a combustion chamber of a gas turbine, follow in accordance with the explanations in respect of the heat shield block.

BRIEF DESCRIPTION OF THE DRAWINGS

The invention is explained in more detail by way of example with reference to the drawing, in which, schematically and partly simplified.

DESCRIPTION OF THE PREFERRED EMBODIMENTS

The same designations have the same meaning in the various figures.

Figure 1:
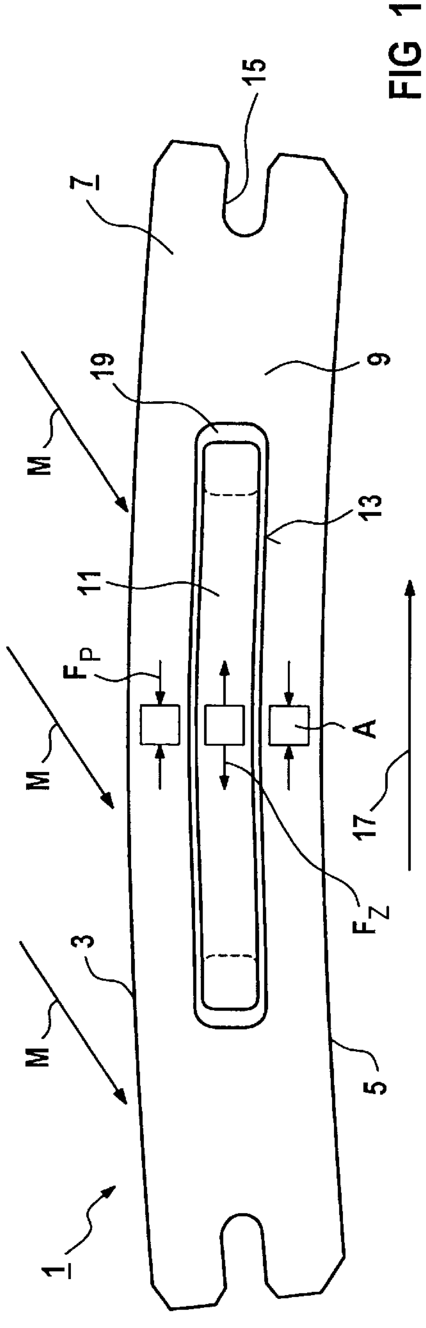
FIGS. 1 and 2 each show a side view of a heat shield block with tension element.

FIG. 1 shows a heat shield block 1 in a side view. The heat shield block 1 has a hot side 3 and a wall side 5 opposite the hot side 3. A peripheral side 7 of the heat shield block 1 adjoins the hot side 3 and the wall side 5. The peripheral side 7 has a peripheral-side surface 9. A hot medium M, for example a hot gas, acts on the hot side 3 during use of the heat shield block 1. A tension element 11 prestressed in the peripheral direction 17 is provided on the peripheral side 7 of the heat shield block 1. In this case, the tension element 11 is prestressed to a prestress $F_z$. The peripheral side 7 has a peripheral groove 13, in which the tension element 11 engages. Due to the prestress $F_z$ of the tension element 11, a compressive stress $F_p$ is produced on the material of the heat shield block 1, this compressive stress $F_p$ acting, for example, on a surface element A. In this case, the tension element 11 is prestressed in such a way that the compressive stress $F_p$ acts essentially in the peripheral direction 17 toward the center of the heat shield block 1. The tension element 11 has a certain elasticity in order to produce a prestress $F_z$ in the peripheral direction 17. Adaptation of the material of the tension element 11 and of the parent material of the heat shield block 1 can achieve a situation in which the tension element 11 is stress-free at a normal temperature, i.e. the prestress $F_z=0$. The normal temperature in this case is preferably room temperature, that is to say about 20° C. This permits especially simple attachment of the tension element 11 to the peripheral side 7 of the heat shield block 1 by the tension element 11 being inserted into the peripheral groove 13. In addition, for this purpose, a certain clearance is provided between the tension element 11 and the peripheral groove 13 in the fitted state, which is achieved by the gap 19.

Specific setting of the coefficients of thermal expansion of the parent material of the heat shield block 1 and of the tension element 11 enables a sufficiently large prestress $F_z$ to be applied to the heat shield block 1 during operation of the heat shield block 1. To this end, the coefficient of thermal expansion of the parent material of the heat shield block 1 is selected to be greater than the coefficient of thermal expansion of the tension element 11. At an application temperature above the normal temperature, which may be up to 1200° C. when the heat shield block 1 is used in a gas turbine, a situation is achieved in which the tension element 11 is under the prestress $F_z$. This is brought about by the relative thermal expansion between the parent material of the heat shield block 1 and the tension element 11. In this case, the tension element 11 is inserted like a clip into the heat shield block 1 and produces a centrally directed compressive stress $F_p$ on the heat shield block 1. This clip function of the tension element 11 holds it in a firmly clipped manner at the application temperature under operating conditions. With the tension element 11, a marked increase in the passive safety and thus endurance of the heat shield block 1 during use in a combustion space, for example in the combustion chamber of a gas turbine, is achieved. The heat shield block 1 is largely protected in particular from the risk of crack formation or crack propagation on the hot side 3, the wall side 5 or the peripheral side 7.

Figure 2:
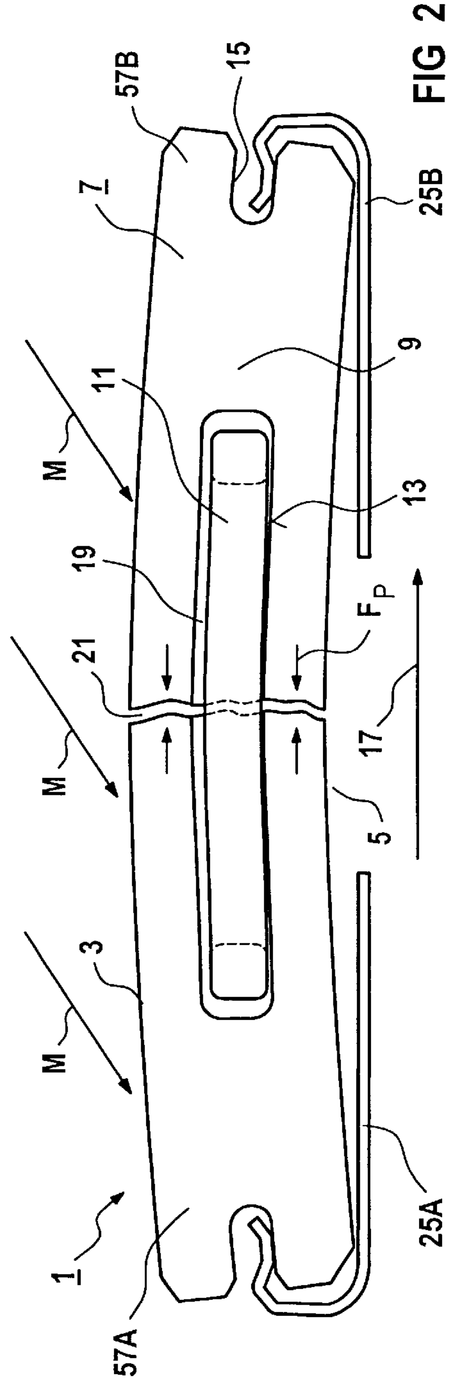

To illustrate these circumstances, FIG. 2 shows a heat shield block 1 with a tension element 11, a crack 21 extending completely through the parent material of the heat shield block 1 from the hot side 3 to the wall side 5. The fracture of the heat shield block 1 in this case has occurred in the center region of the heat shield block 1. Such a crack 21 of the heat shield block 1 is caused as a result of the considerable thermal or mechanical loading, e.g. by striking a combustion chamber wall (not shown in any more detail) of a gas turbine. The crack 21 leads to the heat shield block 1 being split into a first fragment 57A and a second fragment 57B. The fragments 57A, 57B are pressed against one another in the peripheral direction 17 by the compressive stress $F_p$ imparted to the heat shield block 1 by the tension element 11. In this way, a fragment 57A, 57B formed during a fracture is reliably prevented from being released. On the other hand, without the tension element 11 under prestress $F_z$, there would be an acute risk of a fragment 57A, 57B being released from the composite in a direction essentially parallel to the surface normal of the hot side 3. The risk of the fragments 57A, 57B passing into the combustion chamber (not shown in any more detail) of a gas turbine and causing serious damage to further components of a combustion chamber or, for example during use in a gas turbine, to the sensitive blading region of the turbine blades is effectively countered by the provision of the tension element 11. For fastening the heat shield block to a combustion chamber wall (not shown in any more detail), the heat shield block shown in FIG. 2 has a fastening groove 15, in which a retaining element 25A engages. A further retaining element 25B engages in the fastening groove 15 and is arranged opposite the retaining element 25A in the peripheral direction 17. When the heat shield block 1 is fitted, the wall side 5 faces a corresponding wall (not shown in any more detail) of the combustion chamber, so that the heat shield block 1 can be fastened elastically to the wall (not shown in any more detail) via the fastening elements 25A, 25B.

Figure 3:
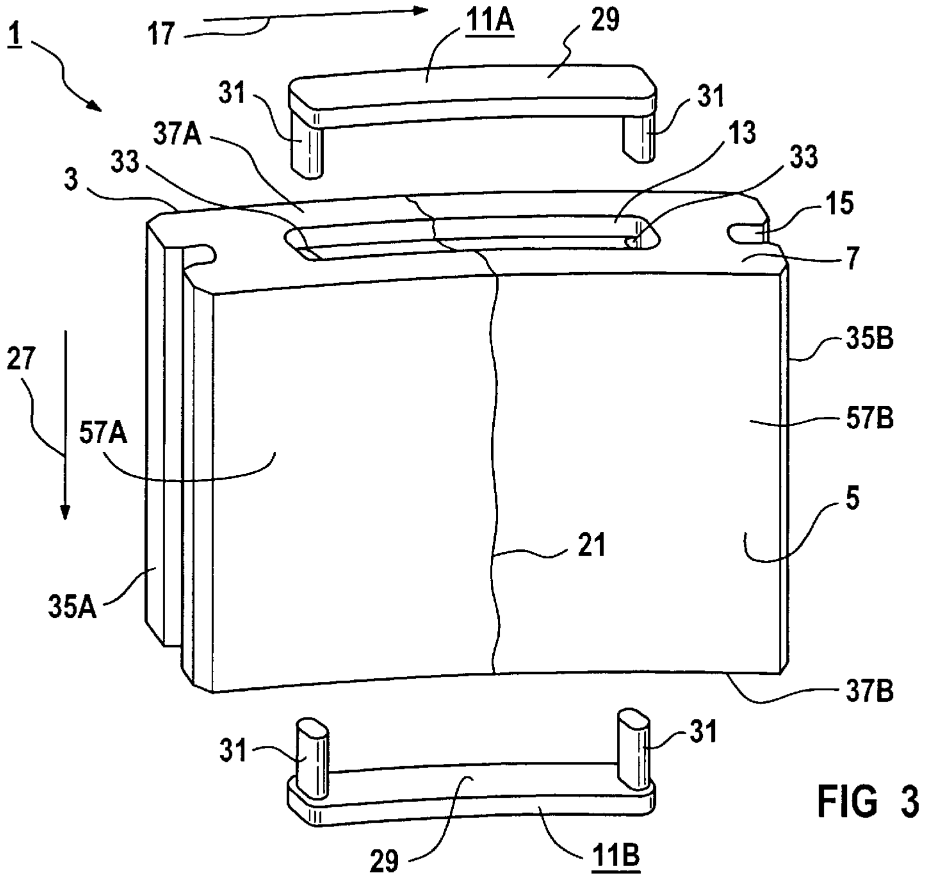
FIG. 3 shows a perspective view of a heat shield block in an exploded representation, FIGS. 4 and 5 each show a variant of the adhesive bonding of the heat shield block to the tension element.

A perspective view of the heat shield block 1 in an exploded representation is shown in FIG. 3. In this case, the heat shield block 1 has an essentially parallelepiped-shaped geometry and extends in a flow direction 27 and a peripheral direction 17. When the heat shield block 1 is used in a combustion chamber of a gas turbine, the flow direction 27 is at the same time also preferably the direction in which the hot medium M flows and acts upon the hot side 3 (cf. also FIGS. 1 and 2). Due to the fastening groove 15 and the peripheral groove 13, the peripheral side 7 is functionally divided into various regions 35A, 35B, 37A, 37B which form sections of the peripheral side 7 adjoining the hot side 3 and the wall side 5. That section of the peripheral side 7 which has the fastening groove 15 is designated as fastening side 35A, 35B, whereas the section having the peripheral groove 13 accommodating the tension element 11A, 11B is designated as end face 37A, 37B. In the exploded representation of FIG. 3, two tension elements 11A, 11B are shown, which, for the sake of clarity, are not inserted into the peripheral groove 13 but are removed from the latter. The tension element 11A in this case is assigned to a peripheral groove 13 in the end face 37A, whereas the tension element 11B is provided on the end face 37B opposite the end face 37A in the flow direction 27. Each of the tension elements 11A, 11B is designed in a clip shape and has a web 29 and in each case two finger-shaped anchors 31. In this case, the finger-shaped anchor 31 is arranged on the two longitudinal ends of the web 29 and projects essentially perpendicularly to the longitudinal extent of the web 29 in the direction of the interior of the heat shield block 1. Corresponding with the finger-shaped anchors 31, the peripheral groove 13 has holes 33, e.g. blind holes, in accordance with the number of finger-shaped anchors 31. During the fitting of the tension elements 11A, 11B, a finger-shaped anchor 31 can be inserted into each of these holes 33 for anchoring the tension element 11A, 11B at the respective end face 37A, 37B.

A possible essentially central crack 21, which splits the heat shield block into a first fragment 57A and a second fragment 57B, is bridged with the tension elements 11A, 11B. Release of the fragments 57A, 57B is prevented by the prestress $F_z$ applied to the tension element 11A, 11B, as already described in connection with FIGS. 1 and 2.

Figure 4:
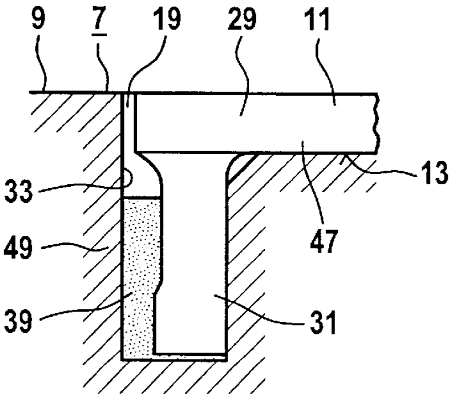
Figure 5:
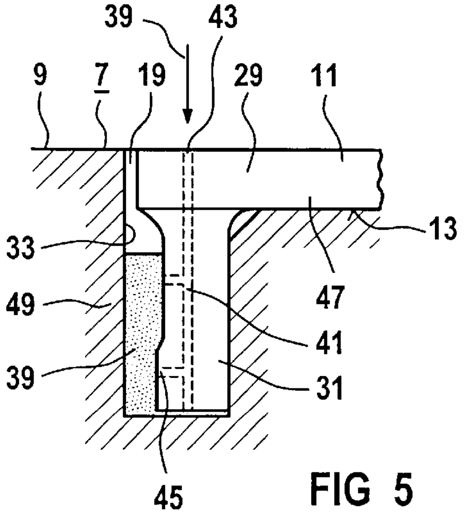
Figure 6:
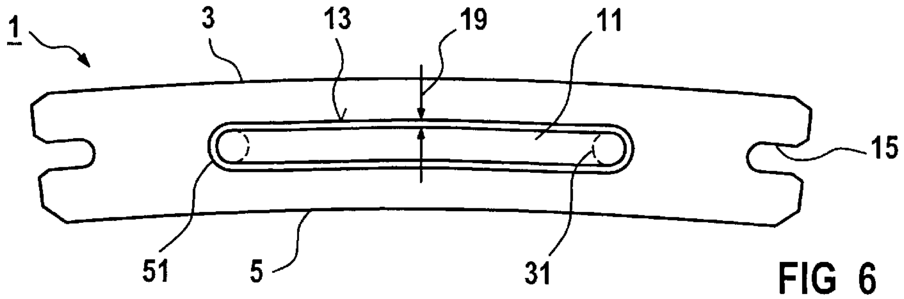
FIG. 6 shows a heat shield block.

To fasten or anchor the tension elements 11A, 11B, various possibilities are proposed, of which two preferred variants are illustrated by way of example in FIGS. 4 and 5. In both variants, adhesive bonding of the finger-shaped anchor 31 to the ceramic parent material 49 of the heat shield block 1 is provided. For this purpose, in FIG. 4, an adhesive 39 is introduced into the hole 33 before the finger-shaped anchor 31 is inserted into the hole 33. To fasten the tension element 11A, 11B, the finger-shaped anchor 31 is inserted into the hole 33 provided with the adhesive 39, the finger-shaped anchor 31 being pressed into the adhesive 39. After the adhesive 39, for example a ceramic adhesive, has set, a reliable and durable adhesive connection is achieved between the finger-shaped anchor 31 and the ceramic parent material 49 of the heat shield block 1. The peripheral side 7 has a peripheral-side surface 9, the tension element 11A, 11B, or respectively the web 29 of the tension element 11A, 11B, engaging in the peripheral groove 13 in such a way that the tension element 11A, 11B terminates flush with the peripheral-side surface 9. It is also possible for the tension element 11A, 11B to be set back from the peripheral-side surface in the direction of the interior of the heat shield block 1. By this configuration, the tension element 11A, 11B is inserted into the heat shield block 1 in a concealed and, as it were, integrated manner and is therefore not directly exposed to a possibly inflowing hot medium M. The clearance provided in the form of a gap 19 between the tension element 11A, 11B permits largely unhindered thermal arching of the heat shield block 1 in the operating case.

FIG. 5 shows an alternative variant, compared with FIG. 4, of the adhesive bonding of the tension element 11 to the ceramic parent material 49 in the region of the hole 33. To this end, the tension element has a passage 41. The passage 41 has an inlet opening 43, which, remote from the peripheral side 7, is provided on the web side on the outer surface of the tension element 11. The passage 41 branches and leads into a multiplicity of outlet openings 45 in the finger-shaped anchor 31. In this case, the tension element 11 with the web 29 and the finger-shaped anchor 31 are preferably made of a ceramic material, for example an $Si_3N_4$-based ceramic. In the present example in FIG. 5, the tension element 11 is made of a ceramic tubular material. The finger-shaped anchor 31 has outlet openings 45 distributed, for example, over the entire axial extent of the anchor 31 and over the entire periphery of the anchor 31. To adhesively bond the tension element 11 to the material 49 of the heat shield block 1 in the region of the hole 33, adhesive 39, for example a ceramic adhesive, is fed to the passage 41 through the inlet opening 39. The adhesive 39 is preferably injected into the inlet opening, so that a uniform and complete distribution of the adhesive 39 in the entire passage 41 and discharge of the adhesive through the outlet opening 45 are possible. Bonding over a large area between the ceramic material 49 of the heat shield block 1 and the finger-shaped anchor 31 is therefore achieved. In this exemplary embodiment, the finger-shaped anchor 31 acts as a hollow anchor, via which the adhesive 39 can be brought in a very specific manner to the regions in the hole 33 which are to be adhesively bonded.

In addition to the use of a ceramic tubular material for the tension element 11, however, the use of a solid ceramic is also possible, as shown, for example, in FIG. 4. In addition to the use of an adhesive 39 for the adhesive bonding, the finger-shaped anchor 31, with which the tension element 11 engages in the heat shield block 1, may be encased with the elastic fiber-ceramic material. This increases the bonding and the endurance of the adhesive connection between the anchor 31 and the ceramic material 49 in the blind hole 33.

Figure 7:
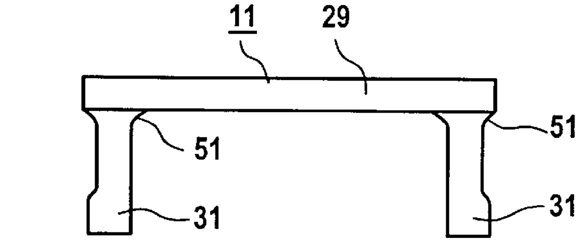
FIGS. 7 and 8 show a respective view of the tension element of the heat shield block shown in FIG. 6.
Figure 8:
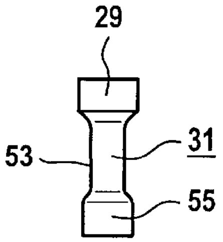

Various design variants of a tension element 11 attached to a heat shield block 1 are shown diagrammatically in the following FIGS. 6 to 14. Here, essentially the cross section of the tension element 11 and of the corresponding peripheral groove 13 accommodating the tension element 11 is varied geometrically. It should be noted that there are no sharp corners or edges on either the tension element 11 or the peripheral groove 13. To this end, radii 51 are provided in the critical regions on the tension element 11 and correspondingly on the peripheral groove 13. FIG. 7 and FIG. 8 show two side views of the tension element 11 as used in the heat shield block 1 according to FIG. 6. The finger-shaped anchor 31 extends essentially perpendicularly to the web 29 and has a shank region 53 and an end section 55 adjoining the shank region 53. The end section 55 is slightly enlarged in cross section relative to the shank region 53, so that especially favorable anchoring of the anchor 31 in the hole 33 can be achieved.

Figure 9:
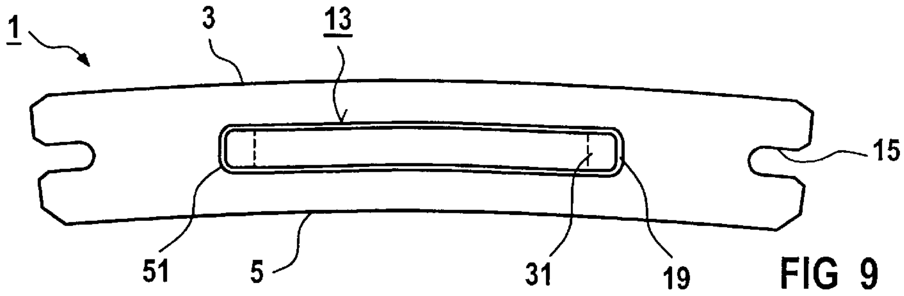
FIG. 9 shows a heat shield block with a variant of the geometric configuration of peripheral groove and tension element.
Figure 10:
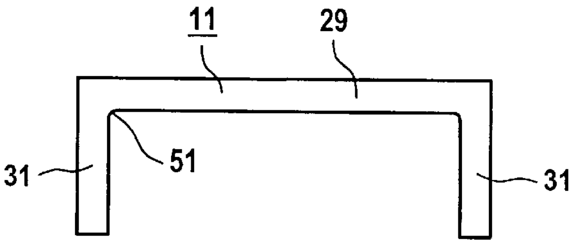
FIGS. 10 and 11 show a respective detail view of the tension element shown in FIG. 9.
Figure 11:
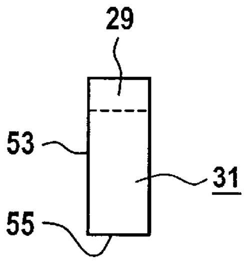
Figure 12:
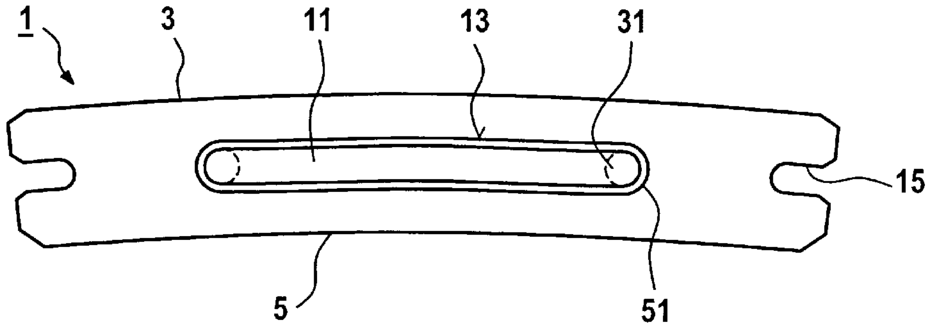
FIG. 12 shows a heat shield block with a further geometric variant of the tension element engaging in the peripheral groove.
Figure 13:
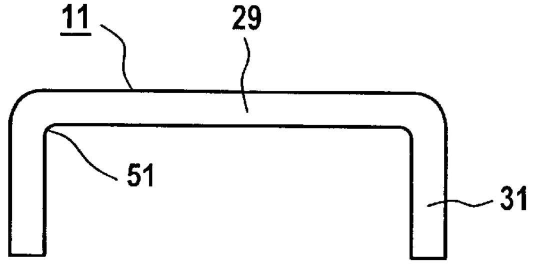
FIGS. 13 and 14 show respective detailed representations of the tension element shown in FIG. 12.
Figure 14:
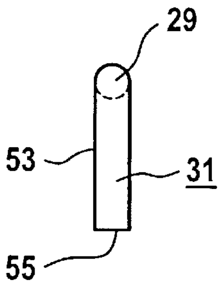

FIGS. 10 and 11 show a tension element 11 as attached to a heat shield block 1 according to the exemplary embodiment in FIG. 9. The cross section of the tension element in this case is essentially rectangular, but may also be square. In accordance with the geometry selected, the peripheral groove 13 is configured so as to be provided with a gap 19 and a radius 51. In a similar manner to the exemplary embodiment in FIGS. 6 to 8, the tension element 11 has a finger-shaped anchor 31 which comprises a shank region 53 and an end section 55. In an analogous manner, FIGS. 12 to 14 show an exemplary embodiment of the invention in which the tension element 11 has an essentially round or oval cross-sectional area.

In all the exemplary embodiments described above, the tension elements are fastened to the heat shield block 1 preferably by means of adhesive bonding with an adhesive 39, e.g. a ceramic adhesive. Adhesive bonding proves to be especially favorable for fitting the heat shield block 1 into a combustion chamber, where the heat shield blocks are used at a high application temperature. In this case, the adhesive bonding of the tension element 11 prevents the tension element 11 from being released from the heat shield block 1 at a normal temperature below the application temperature, that is to say when the tension element is preferably stress-free. The adhesive bonding in this case may be executed in such a way that a form grip is formed between the tension element 11 and the heat shield block 1 after the setting. As a result, the tension element cannot fall out, even if the set adhesive 39 should break, since any fragments of the set adhesive would get caught. In an alternative configuration, a positive-locking connection between tension element 11 and heat shield block 1 is also possible, it being possible to completely dispense with an adhesive 39. In this case, a certain prestress $F_z$ is already to be applied to the tension element 11 at a normal temperature, e.g. room temperature. This prestress serves as a retaining stress in order to reliably clip together the tension element 11 and the heat shield block 1 during assembly.

The advantages of the heat shield block according to the invention lie in a marked increase in the operating reliability during the use of the heat shield block in a combustion chamber, for example in a thermally highly loaded combustion chamber of a gas turbine. In particular, machine damage as a result of a fracture or of a crack through the heat shield block—which may occur as a result of thermal and/or mechanical loading of the heat shield block—is avoided with great certainty, since release of a fragment formed during a fracture is prevented by the tension element. This is accompanied by a marked prolongation of the service life of the heat shield block, since the crack growth is slowed down on the one hand and a larger crack length right up to the exchange limit can be permitted on the other hand. Consequently, a reduction in the number and duration of forced stoppages of the combustion chamber is possible, as a result of which, in particular, the availability of a plant using the heat shield block to line a combustion chamber wall is also increased.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A heat shield block for lining a combustion chamber of a combustion engine comprising:

a hot side wall which is subjected to a hot medium (M), a wall side opposite the hot side, and a peripheral side adjoining the hot side wail and the wall side opposite the hot side, a tension element which is prestressed to a predetermined prestress level ($F_z$) being attached to the peripheral side, wherein the tension element maintains the heat shield block intact due to the tension element being under prestress ($F_z$) and prevents releasing of a fragment of the heat shield block being formed during a fracture of the heat shield block, wherein the tension element is stress-free at a ambient temperature, and in that the tension element is under the prestress ($F_z$) at an application temperature above ambient temperature.

2. The heat shield block as claimed in claim 1 wherein the prestress ($F_z$) is in a direction to maintain heat shield block intact.

3. The heat shield block as claimed in claim 1, wherein the peripheral side wall has a peripheral groove therein, in which the tension element is disposed therein.

4. The heat shield block as claimed in claim 3, characterized in that the peripheral side wall has a peripheral-side surface, with the tension element engaging in the peripheral groove in such a way that the tension element is set back from the peripheral-side surface.

5. The heat shield block as claimed in claim 3, characterized in that the peripheral side wall has a peripheral-side surface, with the tension element engaging in the peripheral groove in such a way that the tension element is flush with the peripheral side surface.

6. The heat shield block as claimed in claim 1 wherein the tension element is fastened by means of an adhesive.

7. The heat shield block as claimed in claim 6 wherein the tension element defines a passage there through into which the adhesive for anchoring the tension element can flow through into the peripheral grove.

8. The heat shield block as claimed in claim 1 further comprising a second tension element being attached to the peripheral side opposite the tension element.

9. The heat shield block as claimed in claim 1 wherein the heat shield block is made of a ceramic parent material.

10. The heat shield block as claimed in claim 1 wherein the heat shield block is made of a refractory ceramic.

11. The heat shield block as claimed in claim 1 wherein the heat shield block is used in a combustion chamber of a gas turbine.

12. A heat shield block for lining a combustion chamber of a combustion engine comprising:

a hot side wall which is subjected to a hot medium (M);

a wall side opposite the hot side;

a peripheral side adjoining the hot side wall and the wall side opposite the hot side; and a tension element which is prestressed to a predetermined prestress level ($F_z$) being attached to the peripheral side, wherein the tension element maintains the heat shield block intact due to the tension element being under prestress ($F_z$) and prevents releasing of a fragment of the heat shield block being formed during a fracture of the heat shield block, wherein the tension element is made of a ceramic material.

13. The heat shield block as claimed in claim 12 wherein the tension element is made of an Si3N4-based ceramic.

14. A heat shield block for fining a combustion chamber of a combustion engine comprising:

a hot side wall which is subjected to a hot medium (M);

a wall side opposite the hot side;

a peripheral side adjoining the hot side wall and the wall side opposite the hot side; and a tension element which is prestressed to a predetermined prestress level ($F_z$) being attached to the peripheral side substantially between the hot side wall and the wall side opposite the hot side, wherein the tension element maintains the heat shield block intact due to the tension element being under prestress ($F_z$) and prevents releasing of a fragment of the heat shield block being formed during a fracture of the heat shield block.

15. A heat shield block as claimed in claim 14 wherein the peripheral side is substantially perpendicular to the hot side wall and the wall side opposite the hot side.

* * * * *